United States Patent

Allan

[15] 3,643,986
[45] Feb. 22, 1972

[54] PIPELINE SADDLE ASSEMBLY

[72] Inventor: Donald R. Allan, Menlo Park, Calif.

[73] Assignee: Raychem Corporation, Menlo Park, Calif.

[22] Filed: Dec. 15, 1969

[21] Appl. No.: 882,358

Related U.S. Application Data

[63] Continuation of Ser. No. 644,291, June 7, 1967, abandoned.

[52] U.S. Cl. ..........................285/197, 285/330, 285/419, 287/111
[51] Int. Cl. ......................................................F16l 41/04
[58] Field of Search..................285/197, 198, 330, 199, 373, 285/419, 70, 73, 5, 18, 404; 287/111, 52.03, 52.04

[56] References Cited

UNITED STATES PATENTS

| 918,078 | 4/1909 | McCaffrey | 287/52.03 |
| 1,405,342 | 1/1922 | Shaffer | 287/52.04 |
| 1,406,247 | 2/1922 | Tubbs | 287/52.03 X |
| 1,982,183 | 11/1934 | Tarbox | 285/330 X |
| 3,132,881 | 5/1964 | Corey | 285/197 |
| 3,292,954 | 12/1966 | Corey | 285/198 |

Primary Examiner—David J. Williamowsky
Assistant Examiner—Wayne L. Shedd
Attorney—Lyon & Lyon

[57] ABSTRACT

An assembly of a pair of axially slidable, interlocking parts which can be installed at any point on a continuous pipe to permit the attachment of a standard tee to the pipe.

15 Claims, 12 Drawing Figures

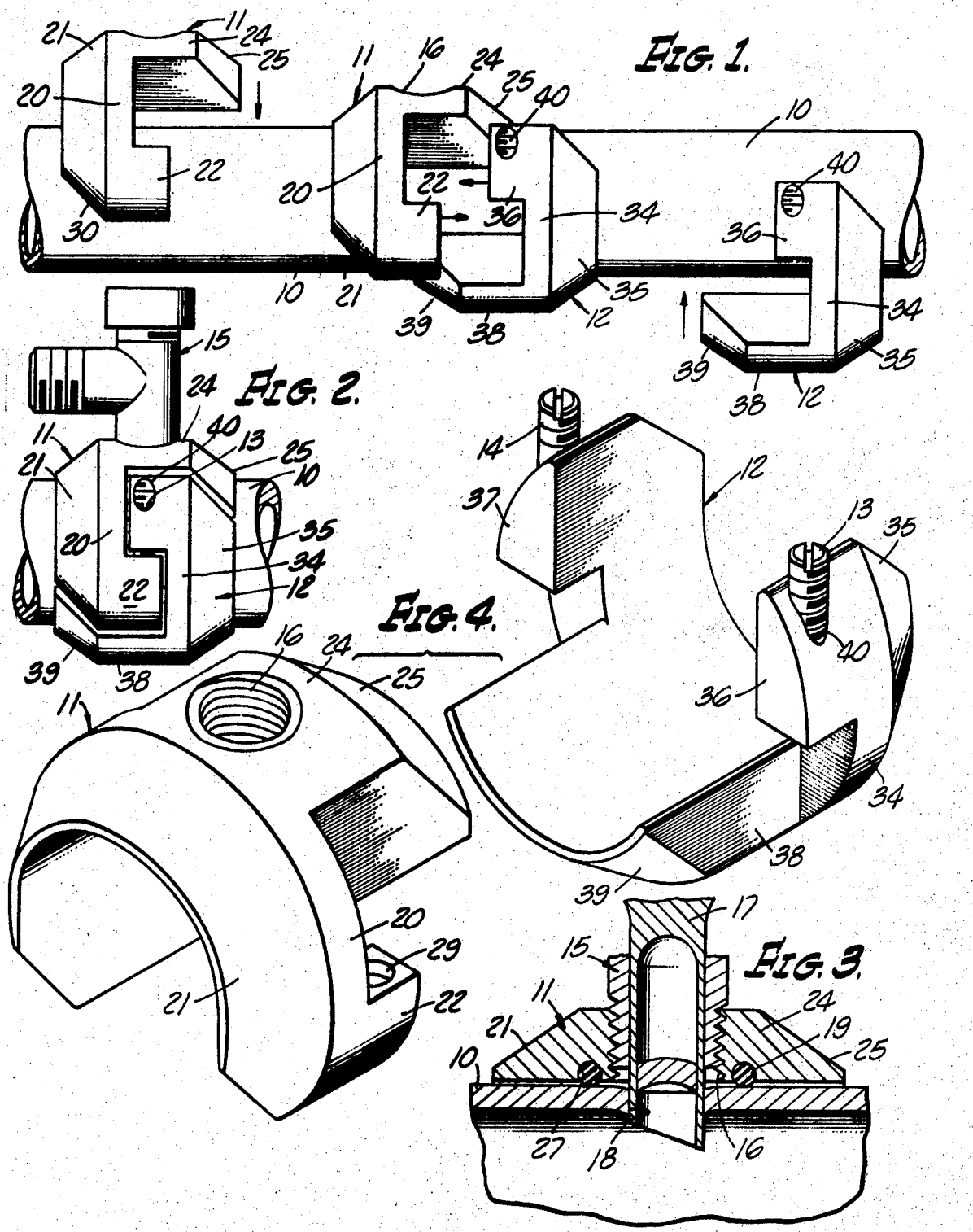

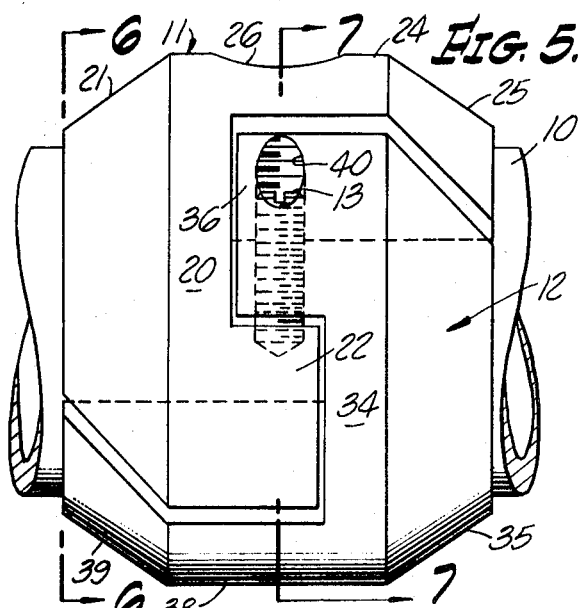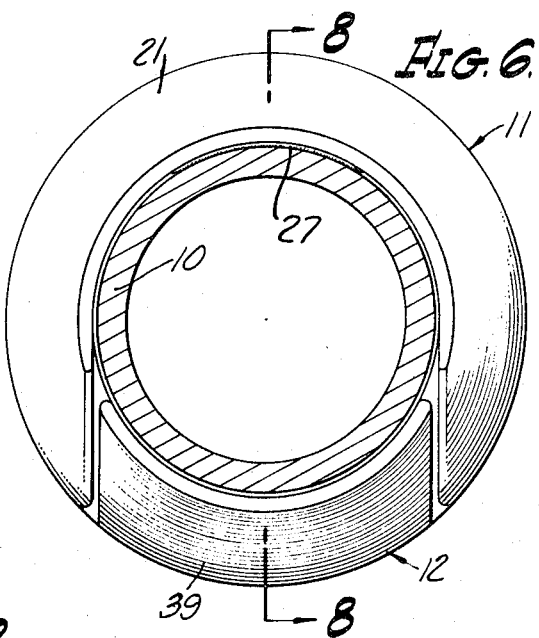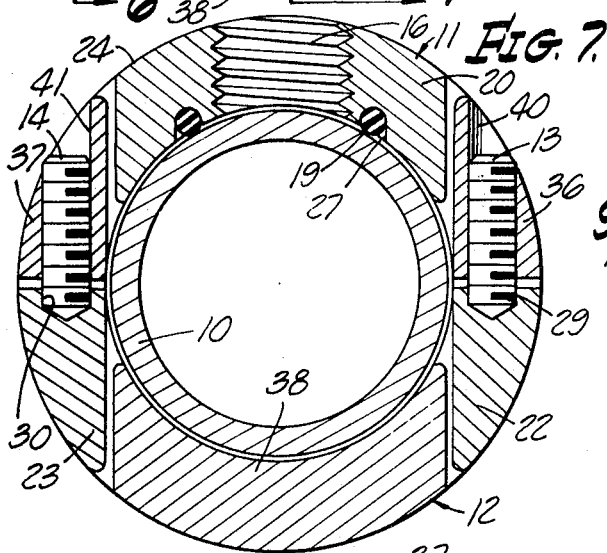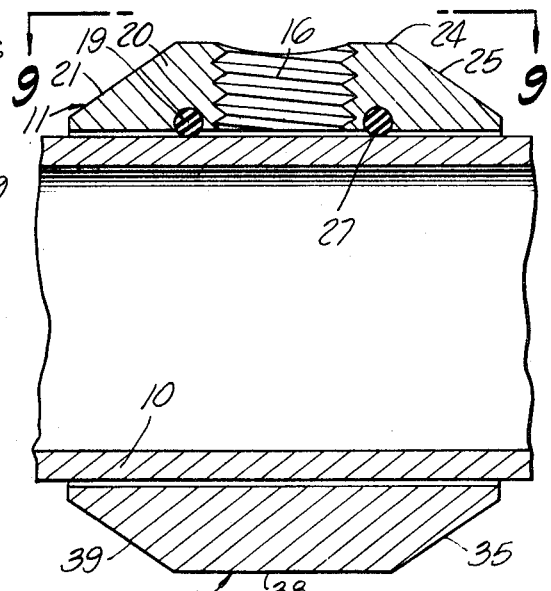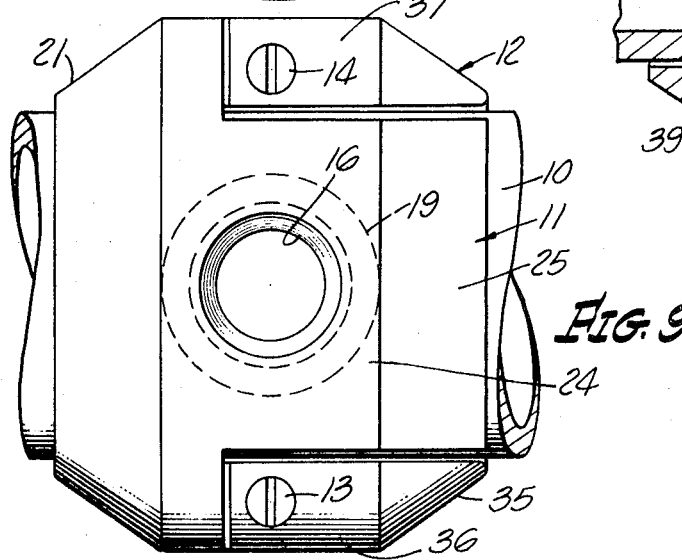

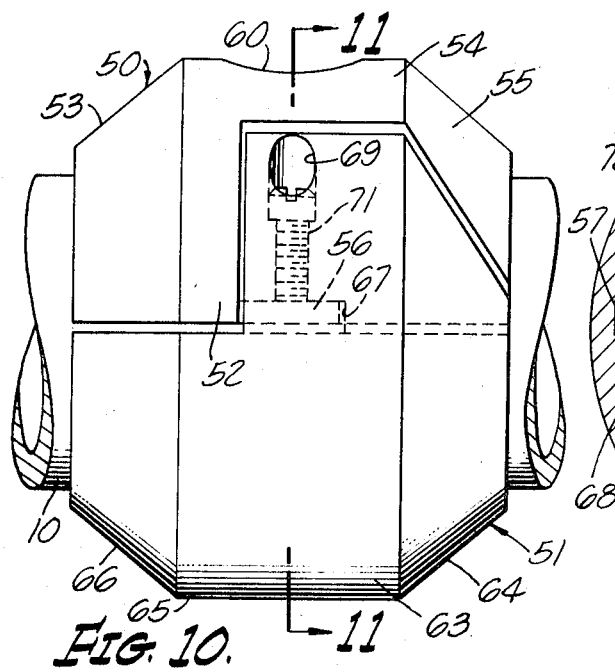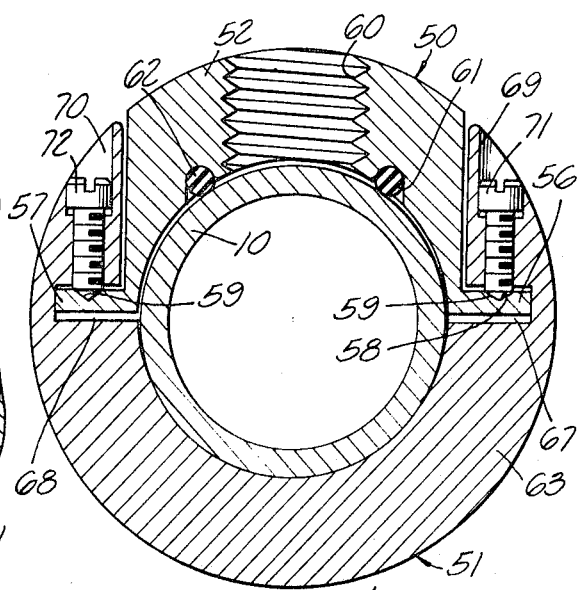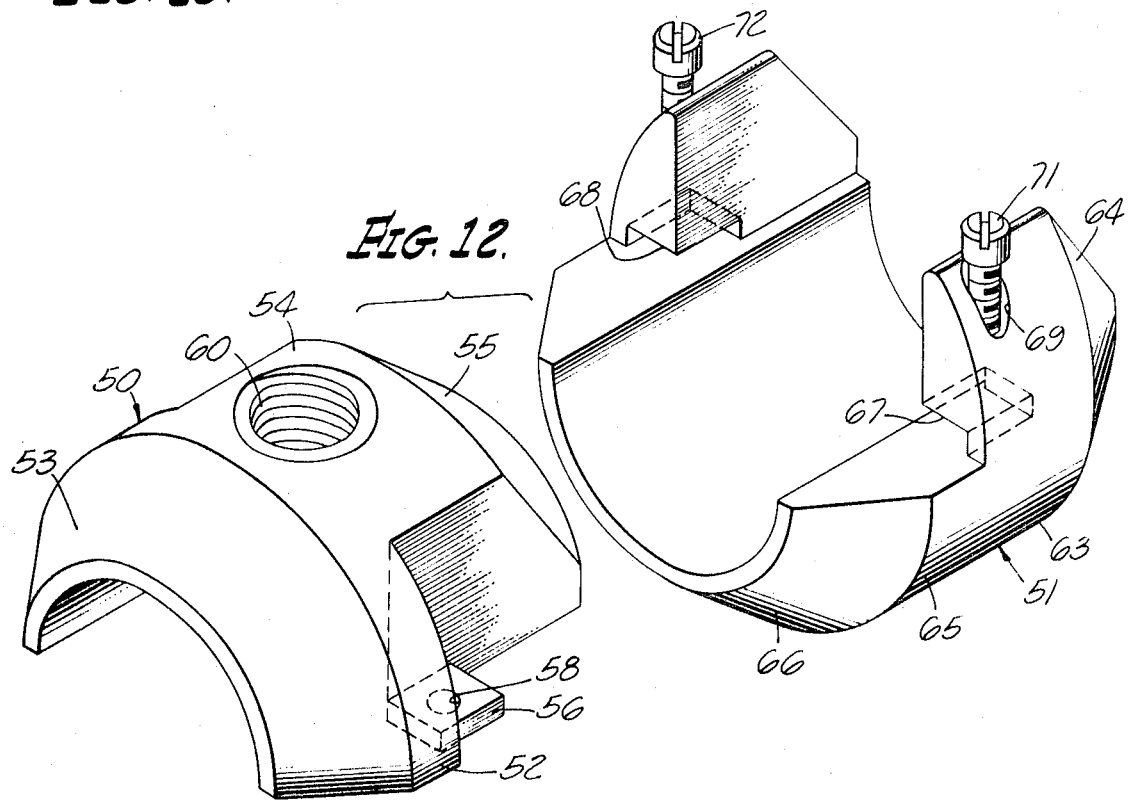

PIPELINE SADDLE ASSEMBLY

This application is a continuation of Ser. No. 644,291, filed June 7, 1967, and now abandoned.

BACKGROUND OF THE INVENTION

In the past, many different types of assemblies have been proposed and used for establishing a branch conduit from a length of pipe, for example, for attaching a tee to a gas or water pipe. Since such attachments have to be made without otherwise disturbing the pipe, or interrupting the flow of fluid therein, such assemblies commonly consist of a plurality of cooperating elements that are positioned around the pipe and then somehow attached together. In some instances, two of the cooperating parts are hinged along one edge and provided with lugs or the like along the other permitting them to be bolted together to secure the assembly on the pipe. Other assemblies have been provided in which two cooperating parts are slid toward each other along the axis of the pipe until they wedge firmly together. Similar assemblies have been provided with external wedges that are driven into place after the cooperating elements have been slid together.

None of the assemblies that have heretofore been proposed have been found to be completely satisfactory. Some are difficult to install; others are not reliable either during installation when fairly high torques are exerted on them as a result of the pipe being tapped or during use if high pressures are present in the pipe. The configuration of the parts required in many of the prior art assemblies were difficult to manufacture and thus the cost of the assemblies was economically prohibitive. With some of the assemblies it was difficult to make a good sealing connection around the point where the pipe was tapped to prevent leakage of the fluid carried therein. Because of the irregular shape of the assemblies and the many protuberances that were often associated therewith, the assemblies were difficult to protect from corrosion by simple and inexpensive techniques.

SUMMARY OF THE INVENTION

According to the present invention an assembly is provided for installing a tee or the like on a pipe which overcomes the above-mentioned problems. The assembly is made up of a pair of cooperating members having cantilevered sections that are positioned over the pipe and slid axially along the pipe toward each other until they interlock. The construction of the members is such that they can withstand the torque exerted by the tapping of the pipe. The members are fastened together by means of internal screws and the outer surface of the assembly when installed is smooth and regular without protruding elements. The internal screws are under compressive load and transfer the load to the cantilevered sections so that these sections, and not the screws, absorb the load. Consequently, both the assembly itself, and the necessary protective covering, can be installed quickly and simply.

It is therefore an object of the present invention to provide an assembly for use in clamping a tubular member such as a pipe so that an operation such as perforating can be performed on it and such that the assembly can easily be protected from corrosion.

BRIEF DESCRIPTION OF THE DRAWING

FIG. 1 is an elevation view showing the sequence of operation in installing an assembly according to a first embodiment of the present invention;

FIG. 2 is a side elevation of the assembly of FIG. 1 after it has been installed and a tee mounted therein;

FIG. 3 is a sectional detail of the assembly shown in FIG. 2;

FIG. 4 is an exploded perspective view of the two cooperating members of the first embodiment of the present invention;

FIG. 5 is an enlarged side elevation of the first embodiment of the present invention;

FIG. 6 is a sectional detail taken along lines 6—6 of FIG. 5;

FIG. 7 is a sectional detail taken along lines 7—7 of FIG. 5;

FIG. 8 is a sectional detail taken along lines 8—8 of FIG. 6;

FIG. 9 is a top plan view taken along lines 9—9 of FIG. 8;

FIG. 10 is a side elevation of a second embodiment of the present invention;

FIG. 11 is a sectional detail taken along lines 11—11 of FIG. 10; and

FIG. 12 is an exploded perspective view of the second embodiment of the present invention.

DESCRIPTION OF THE INVENTION

FIG. 1 shows the manner in which the present invention is installed on a tubular member such as a pipe 10. Although the assembly illustrated is in accordance with a first embodiment of the invention as is more completely illustrated in FIGS. 4, 5, 6, 7, 8, and 9, the manner in which the second embodiment is installed is similar. As shown in FIG. 1, collar segments 11 and 12 are positioned on the top and bottom of the pipe respectively and then moved axially along the pipe until they engage each other. The collar segments are then connected together by means of setscrews 13 and 14, and as shown in FIGS. 2 and 3, a standard tee 15 can then be inserted in a threaded passageway 16 provided in the segment 11 for that purpose. As can be seen in FIG. 3, the tee 15 is preferably of the type that includes a punch 17 for tapping a hole in the pipe 10 and then controlling the flow of fluid through the hole 18 so tapped. In order to prevent leakage of the fluid, the member 11 is provided with an O-ring 19 that surrounds the passageway 16 into which the tee 15 is inserted.

Turning now to FIGS. 4 through 9, the details of the first embodiment of the assembly of the present invention are illustrated in more detail. The collar segment 11 comprises a generally U-shaped or arcuate body 20 having a tapering neck portion 21 extending axially in one direction and a pair of lugs 22 and 23 extending axially in the other direction. A projection 24 provided with a tapered lip 25 extends in the same direction as the lugs 22 and 23. The sides of both the lugs and the projection are straight or vertical while the inner surface of the body and the projection are suitably curved to match the pipe's curvature. Of course, the lugs are spaced apart sufficiently to form an opening for receiving the pipe 10. The outer surface of the projection 24 has the same radius of the curvature as the body 20 and forms a continuous surface therewith, as do the outer surfaces of lugs 22 and 23. The threaded hole 16 is formed partially in the projection 24 and partially in the body 20 for receiving the tee 15. A groove 27 is formed around the base of the hole 16 and receives the O-ring 19 for establishing a seal around the hole 16 when the assembly is installed. Each of the lugs 22 and 23 is provided with countersunk holes 29 and 20 respectively.

The collar segment 12 is similar in construction to the collar segment 11 and has a generally U-shaped or arcuate body 34 having a tapering neck portion 35, a pair of lugs 36 and 37, and a projection 38 extending axially from the body. The projection 38 has a tapering lip 39, the degree of taper being matched to that of the neck portion 21 of the segment 11. The lugs 36 and 37 are provided with threaded holes 40 and 41 respectively for receiving setscrews 13 and 14.

As can be seen, when the collar segments 11 and 12 are slid axially toward each other, the lugs 36 and 37 of the collar segment 12 fit into the recesses formed between the lugs 22 and 23 and the projection 24 of the segment 11 while the lugs 22 and 23 of the segment 11 will fit into the similar recesses formed in the segment 12. After the collar segments 11 and 12 are fitted together, the setscrew 13 and 14 are screwed into the countersunk holes 29 and 30 to tightly fasten the segments together and press the O-ring 19 firmly against the wall of the pipe 10 to establish a seal therewith. The tapered lip 39 of the projection 38 completes the circumference of the neck portion 21 of the segment 11 while the tapered lip 25 of the segment 11 does the same for the neck portion 35 of the segment 12. As can be seen, the assembly is now securely installed on the pipe with the interlocking lugs endowing it with great strength and stability. The outer surface or profile of the assembly is smooth and regular and thus easily adaptable to the various corrosion protecting techniques, for example, the heat-shrinkable tubing disclosed in application Ser. No. 506,161, filed Nov. 3, 1965 by Roger H. Ellis. The assembly is now ready to receive the tee 15 so that the branch line from the pipe 10 can be established. Although the tee has been shown as a separate item, if desired, it could be cast integrally with the segment 11. Since both of the collar segments 11 and 12 are identical except for the various holes and grooves formed therein, they can be cast with the same molds thus decreasing the cost of manufacture.

Turning now to FIGS. 10 through 12, there is shown a second embodiment of the assembly of the present invention. This embodiment has the same outward shape as that shown in FIGS. 1-9 but the construction of collar segments 50 and 51 are somewhat different from segments 11 and 12. The segment 50 has an arcuate or semicircular body 52 including a tapering neck portion 53, a projection 54 having a tapering lip portion 55 and a pair of integral inserts 56 and 57 in which are formed shallow depressions 58 and 59 respectively. A threaded hole 60 is formed partially in the projection 54 and partially in the arcuate body 52 and serves to receive a tee such as the tee 15. The segment 50 is provided with a groove 61 around the threaded hole 60 for receiving an O-ring 62 so that a sealing engagement is made with the pipe on which it is installed. The inside surface of the body 52 and projection 54 are curved to accommodate the pipe with which it is used, the pipe being received in the opening between the inserts 56 and 57. The outer surface of the projection 54 has the same radius of curvature as the body 52 and forms a continuous surface therewith.

The segment 51 has an arcuate or semicircular body 63 including a tapering neck portion 64 and a projection 65 extending axially therefrom, the projection 65 having a tapered end portion 66. The arcuate body 63 is provided with a pair of recesses 67 and 68 for receiving the inserts 56 and 57 and is further provided with holes 69 and 70 for receiving setscrews 71 and 72.

When the segments 50 and 51 are moved axially towards each other, the inserts 56 and 57 of the segment 50 enter into the recesses 67 and 68 of the segment 51, the tapered lip 55 of the segment 50 completes the neck 64 of the segment 51 and the tapered lip 66 of the segment 51 completes the neck 53 of the segment 50. The setscrews 71 and 72 are then screwed into the holes 69 and 70 and into the depressions 58 and 59 formed in the inserts 56 and 57 to tightly fasten the two collar segments together and prevent relative axial movement between them. The tee can then be installed and the assembly protected in the same manner as described hereinabove.

From the foregoing description it can be seen that an assembly has been provided that is relatively inexpensive to manufacture and which can easily and quickly be installed on tubular member such as a pipe. The external profile of the assembly is such that it can easily be provided with a suitable protective covering. The assembly can be used with different types of pipe, for example, cast iron, brass, plastic, or the like. The parts are relatively inexpensive to manufacture and can be made of any suitable material that will be compatible with the fluid being handled and the strength requirements of the installation. Because of the interlocking nature of the collar segments of the assembly and its design wherein the internal screws are under compression, it is capable of withstanding the torques involved in its installation, and the installation of the tee associated with it and can hold substantial pressures after it is installed on a pipe and a tap made thereto.

While particular embodiments of the present invention have been shown and described, it will be obvious to those skilled in the art that changes and modifications may be made without departing from the invention in its broader aspects.

What is claimed is:

1. An assembly adapted to be installed at any point along a tubular member without the need for access to a free end of the member comprising: first and second collar segments; said first collar segment having an arcuate body portion defining a transversely opening recess extending axially through said body portion, said recess having an inner surface comprising at least an arcuate portion extending over an angle of not more than 180° for transversely receiving said tubular member, a projection extending axially away from said body portion, the outer surface of said projection forming a continuous surface with said body portion, and projecting means extending axially away from said body portion; said second collar segment having an arcuate body portion defining a transversely opening recess extending axially through said body portion, said recess having an inner surface comprising at least an arcuate portion extending over an angle of not more than 180° for transversely receiving said tubular member, a projection extending axially away from said body portion, the outer surface of said projection having substantially the same radius of curvature as said body portion and forming a continuous surface therewith, said body portion of said second collar segment having recesses formed therein which mate with and axially receive said projecting means of said first collar segment, the projections of each of said collar segments closing the opening of the other collar segment whereby said assembly has a substantially smooth and regular outer surface and holding means maintained in a nonengaging relationship with respect to said tubular member, said holding means contacting at least one of said projecting means to urge said collar segments together in engaging relationship against said tubular member.

2. The assembly of claim 1 wherein each of said collar segments has a tapered portion on the side of said body portion remote from said projection, and wherein the projection of each of said collar segments has a tapered portion at the outer end thereof.

3. The assembly of claim 1 wherein said first collar segment is provided with a threaded hole therethrough for communicating with the tubular member on which said assembly is installed.

4. An assembly adapted to be installed at any point along a tubular member without the need for access to a free end of said member comprising: first and second collar segments, each of said collar segments having a body portion defining a transversely opening recess extending axially through said body portion, said recess having an inner surface comprising at least an arcuate portion extending over an angle of not more than 180°, for transversely receiving said tubular member, said body portion including lug means extending axially away from said body portion, said projection and said lug means defining recesses, said lugs of each of said collar segments mating with and extending axially into the recess of the other of said collar segments and holding means maintained in a nonengaging relationship with respect to said tubular member, said holding means contacting at least one of said lug means to urge said collar segments together in engaging relationship against said tubular member.

5. An assembly adapted to be installed at any point along a tubular member without the need for access to a free end of the member comprising: first and second collar segments, each of said collar segments comprising a body portion defining a transversely opening recess extending axially through said body portion, said recess having an inner surface comprising at least an arcuate portion extending over an angle of not more than 180°, for transversely receiving said tubular member, a projection extending axially away from said body portion and a pair of lugs extending axially away from said body portion, said projection and said lugs defining a pair of recesses, said lugs of each of said collar segments mating with and extending axially into the recesses of the other of said collar segments and the projection of each of said collar segments mating with and extending axially into the opening of the other of said collar segments whereby said assembly has a substantially smooth outer surface and holding means maintained in a nonengaging relationship with respect to said tubular member, said holding means contacting at least one of said lug means to urge said collar segments together in said interengaged position and in engaging relationship against said tubular member.

6. An assembly adapted to be installed at any point along a tubular member without the need for access to a free end of the member comprising: first and second collar segments, each of said first and second collar segments comprising an arcuate body portion defining a transversely opening recess extending axially through said body portion, said recess having an inner surface comprising at least an arcuate portion extending over an angle of not more than 180°, for transversely receiving said tubular member and including a pair of lugs extending axially away from the remainder of said body portion each of said collar segments having a tapered portion on the side of said body portion remote from said projection, and wherein the projection of each of said collar segments has a tapered portion at the outer end thereof, a projection extending axially away from said body portion, the outer surfaces of said projection and said lugs forming a continuous surface with said body portion, said lugs having a lesser axial dimension than said projection, said projection and said lugs defining a pair of recesses, said lugs of each of said collar segments mating with and extending axially into the recesses of the other of said collar segments and the projection of each of said collar segments mating with and extending axially into the opening of the other of said collar segments whereby said assembly has a substantially smooth and regular outer surface and holding means contacting at least one of said lug means to hold said collar segments in said interengaged position.

7. The assembly of claim 6, wherein said holding means includes said lugs and said lugs of said second collar segment are each provided with holes passed therethrough and screw means positioned in said holes wherein said lugs of said first collar segment are provided with holes for receiving said screw means and wherein said first collar segment is provided with a threaded hole therethrough for communicating with the tubular member on which said assembly is installed said hole being provided with sealing means around said hole for sealingly engaging said tubular member.

8. An assembly adapted to be installed at any point along a tubular member comprising: first and second collar segments, each of said collar segments having an arcuate body portion defining a transversely opening recess extending axially through said body portion, said recess having an inner surface comprising at least an arcuate portion extending over an angle of not more than 180°, for transversely receiving said tubular member and a projection extending away from said body portion, said first collar segment having a pair of insert means, one of said insert means being positioned on either side of said projection and extending in the same direction thereas, said second collar segment having a pair of recesses formed in the body thereof, one of said recesses being formed on either side of said projection, said recesses of said second collar segment slidingly receiving said insert means of said first collar segment and holding means, maintained in a nonengaging relationship with respect to said tubular member, said holding means contacting at least one of said insert means to urge said collar segments together in engaging relationship against said tubular member.

9. An assembly adapted to be installed on a tubular member comprising: first and second collar segments, each of said collar segments comprising an arcuate body portion defining a transversely opening recess extending axially through said body portion, said recess having an inner surface comprising at least an arcuate body portion extending over an angle of not more than 180°, for transversely receiving said tubular member and a projection extending axially away from said body portion, said first collar segment having a pair of insert means, one of said insert means being positioned on either side of said projection and extending in the same direction thereas, said insert means being connected to said projection, said second collar segment having a pair of recesses formed in the body portion thereof on either side of the opening therein and immediately overlying said projection, said recesses of said second collar segment being adapted to receive said insert means of said first collar segment, the projection of each of said collar segments adapted to close the opening of the other collar segment and holding means contacting at least one of said insert means to hold said collar segments in said interengaged position.

10. An assembly adapted to be installed at any point along a tubular member without the need for access to a free end of the member comprising: first and second collar segments, each of said collar segments comprising a semicircular body portion defining a transversely opening recess extending axially through said body portion, said recess having an inner surface comprising at least an arcuate portion extending over an angle of not more than 180° for transversely receiving said tubular member and a projection extending axially away from said body portion, the outer surface of said projection forming a continuous surface with said body portion, each of said collar segments having a tapered portion on the side of said body portion remote from said projection and the projection of each of said collar segments having a tapered portion at the outer ends thereof, said first collar segment having a pair of insert means, one of said insert means being positioned on either side of said projection and extending in the same direction thereas, said insert means being connected to said projection, said second collar segment having a pair of recesses formed in the body portion thereof on either side of the opening therein and immediately overlying said projection, said recesses of said second collar segment being capable of receiving said insert means of said collar segment, the projection of each of said collar segments capable of closing the opening of the other collar segment, whereby said assembly has a substantially smooth and regular outer surface and wherein said body portion of said second collar segment is provided with holes passed therethrough and screw means positioned in said holes and wherein said insert means of said first collar segment are provided with depressions for receiving said screw means, said first collar segment being provided with a threaded hole therethrough for communicating with the tubular member on which said assembly is installed, said threaded hole being provided with sealing means around said threaded hole for sealingly engaging said tubular member.

11. The assembly of claim 4 wherein each of said lug means are provided with means for fastening said segments together, said lug means being under compression.

12. The assembly of claim 11 wherein said fastening means comprise screw means passed through the lug means of one segment into the lug means of the other segment.

13. The assembly of claim 4 wherein each of said collar segments has a tapered portion on the side of said body portion remote from said projection, and wherein the projection of each of said collar segments has a tapered portion at the outer end thereof.

14. An assembly adapted to be installed on a tubular member without the need for access to a free end of the member comprising: first and second collar segments; each collar segment having an arcuate body portion having an inner surface comprising at least an arcuate portion extending over an angle of not more than 180°, for transversely receiving said tubular member, a projection extending axially away from said body portion, the outer surface of said projection having substantially the same radius of curvature as said body portion and forming a continuous surface therewith, and a pair of projecting means extending axially away from said body portion, the outer surface of said projection having substantially the same radius of curvature as said body portion and forming a continuous surface therewith, said body portion of said second collar segment having recesses formed therein which mate with and axially receive said projecting means of said first collar segment, the projections of each of said collar segments to substantially close the opening of the other collar segment whereby said assembly has a substantially smooth and regular outer surface, and screw means passed through said projecting means of said second collar segment into engagement with said first collar segment for fastening said first collar segment to said second collar segment and wherein said screw means are under compression and transfer the load to said collar segments.

15. An assembly for installation on a tubular member comprising:

a first collar segment having a body portion, the body portion having an axial opening therein capable of receiving the tubular member, a projection extending axially away from the body portion and first and second projecting means extending axially away from the body portion in the same direction as the projection, and a second collar segment having a body, the body having an axial opening therein capable of receiving the tubular member and an opening capable of receiving the projection of the first collar segment, a projection extending axially away from the body, the body of the second collar segment having first and second recesses formed in portions thereof for receiving respectively the first and second projecting means of the first collar segment, the projection means of the first collar segment not wholly overlying, when the two collar segments are assembled, the portions of the second collar segments that overlie the recesses, to enable a first screw to pass through the portion of the second collar segment overlying the first recess and to engage the first projecting means and a second screw to pass through the portion of the second collar segment overlying the second recess and to engage the second projecting means, without either of said screws passing through the projection of the first collar segment.

* * * * *